F. W. BARTLETT.
SEALING-IN MACHINE.
APPLICATION FILED OCT. 4, 1913.
1,124,386.
Patented Jan. 12, 1915.
3 SHEETS—SHEET 3.
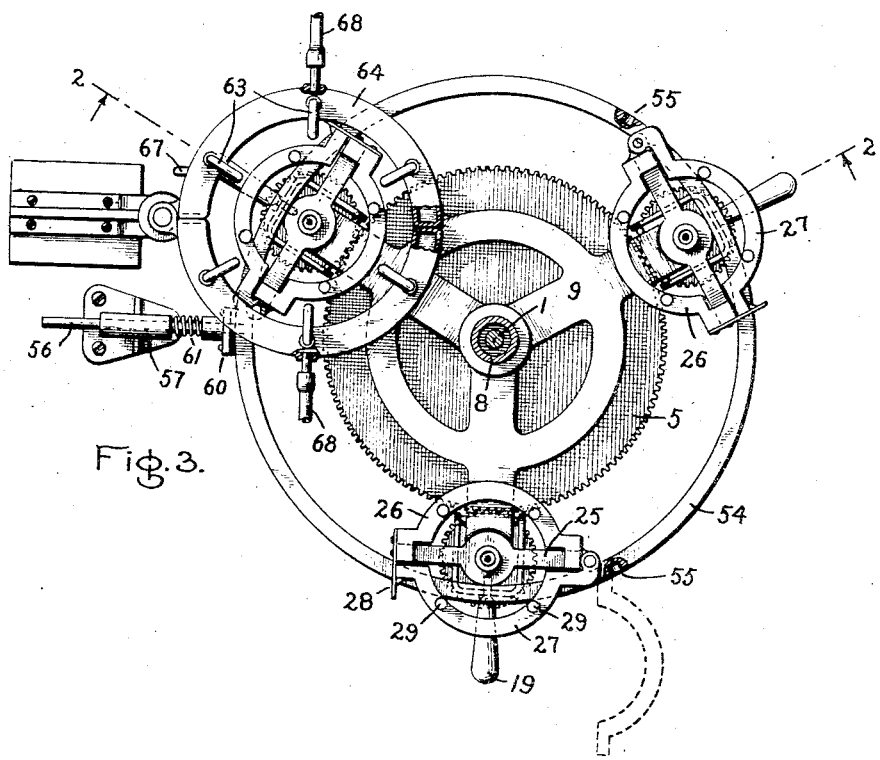
Fig. 3.
Fig. 4.
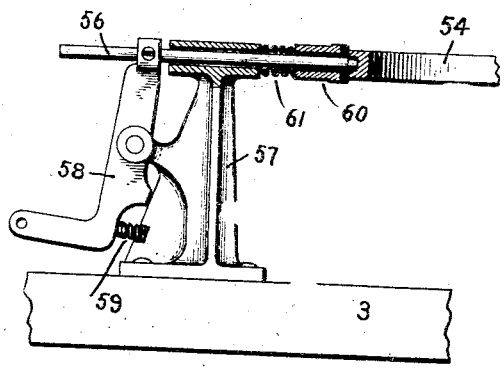
Witnesses:
Martha Retford
Genevieve Haynes
Inventor:
Frederick W. Bartlett,
by
His Attorney.

UNITED STATES PATENT OFFICE.

FREDERICK W. BARTLETT, OF CALDWELL BOROUGH, NEW JERSEY.

SEALING-IN MACHINE.

1,124,386.   Specification of Letters Patent.   Patented Jan. 12, 1915.

Application filed October 4, 1913. Serial No. 793,290.

*To all whom it may concern:*

Be it known that I, FREDERICK W. BARTLETT, citizen of the United States, residing in the borough of Caldwell, in the county of Essex and State of New Jersey, have invented certain new and useful Improvements in Sealing-In Machines, of which the following is a specification.

This invention relates to a machine to be used in the process of making a glass double-walled, vacuum insulated, silver-coated, reflector-surfaced food jar or bottle, so constructed that when food in either solid or liquid form is put into the jar and the mouth of said jar is closed by a suitable closure, the tendency is to retain the contacts with but little change in temperature for a number of hours.

The present invention concerns the sealing together of two receptacles or blanks, one inside the other, so as to form the double-walled jar with a space between its inner and outer walls. The blanks are preferably cylindrical, with one hemispherical closed end and the other end open. One of them is nested concentrically inside the other and then the edges of their open ends are softened by heat and sealed or fused together—from which operation I have designated my invention as a "sealing-in" machine.

It consists in brief, of a plurality of carriers, preferably three, revoluble around a central standard; means for lowering the inner blank into the outer one and centering it; means for heating the upper edges of the two blanks; and means for pressing them together and shaping the fused edges.

The invention will be better understood from the following detailed description, taken in connection with the accompanying drawings, in which—

Figure 1:
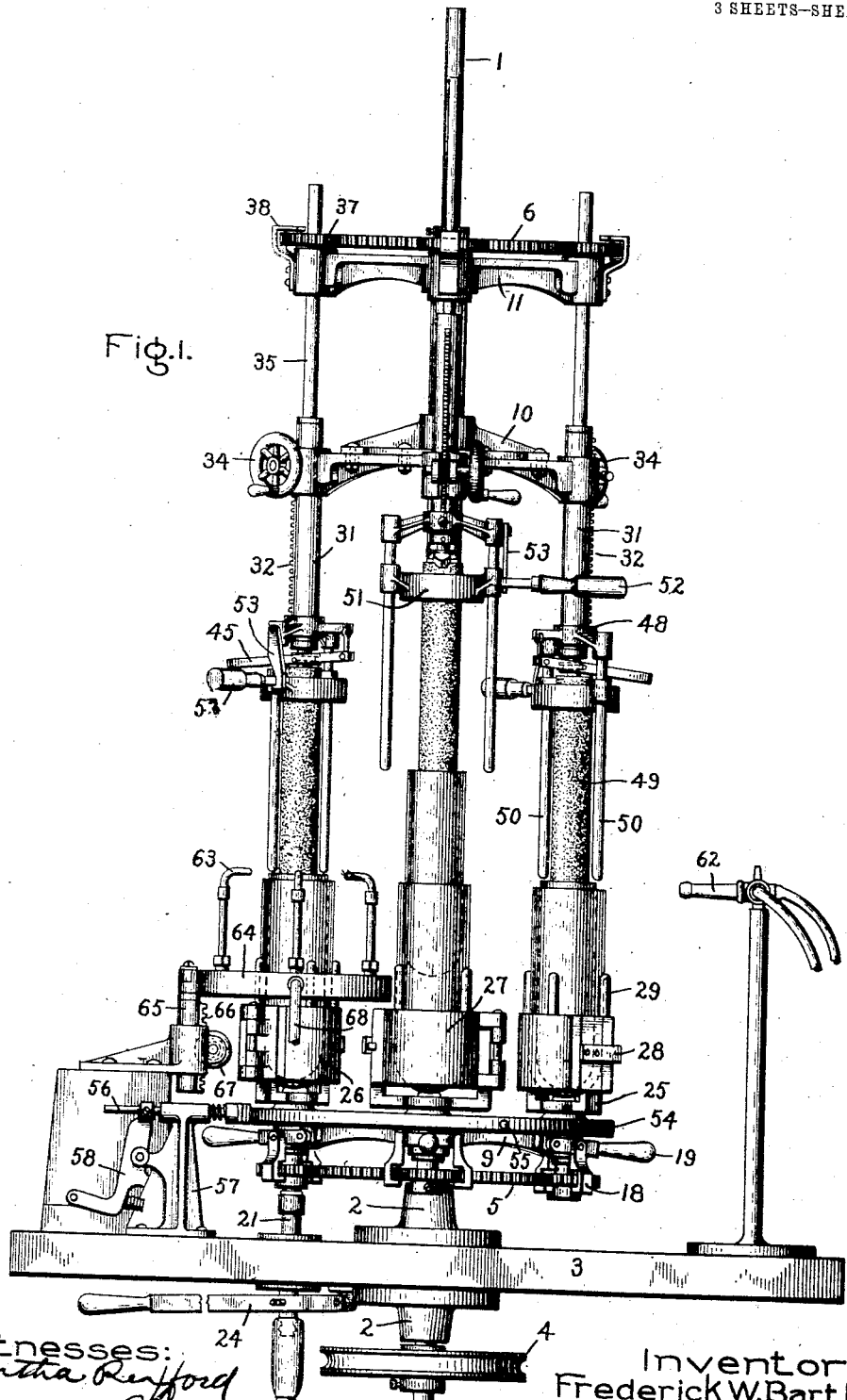
Figure 2:
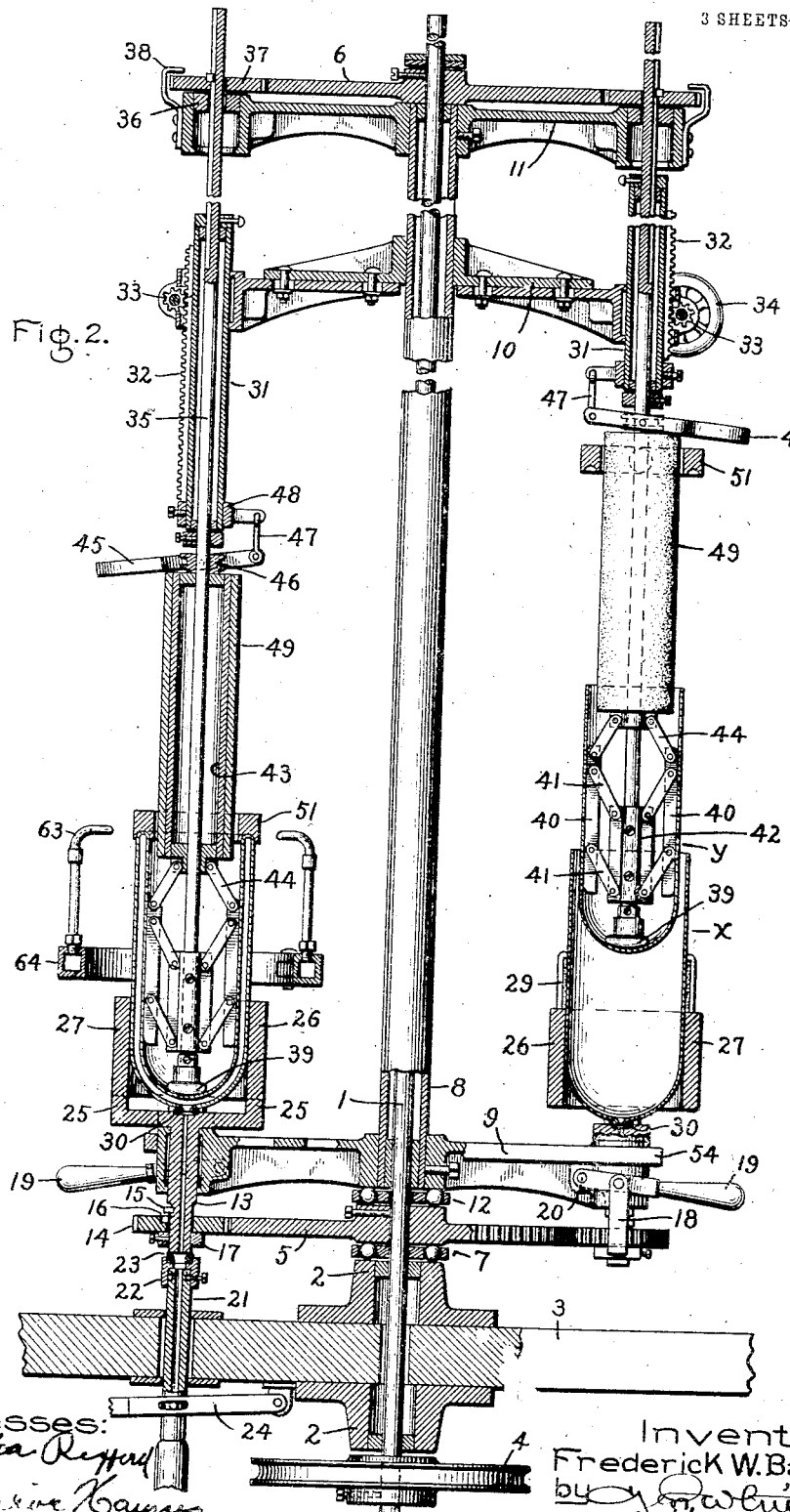

Figure 1 is a front elevation of the machine; Fig. 2 is a vertical section on the line 2—2, Fig. 3: Fig. 3 is a cross-sectional plan view, and Fig. 4 is a section of the brake and stop.

The machine illustrated has three carriers, and is run by two operators; one to load and unload the carriers and the other to manipulate the gas fires and accomplish the sealing together of the two glass blanks.

A central upright shaft 1 is journaled in bearings 2 carried by a suitable support 3 and is rotated at a constant speed by a belt pulley 4 or other equivalent means. Secured respectively to the upper and lower ends of said shaft are two horizontal spur gears 5, 6, preferably of the same size, the hub of the lower one being preferably supported by a roller bearing 7. A sleeve 8 surrounds the shaft and carries three spiders 9, 10, 11, the lower one, 9, being supported on a ball bearing 12 on the hub of the lower spur gear, so that said sleeve and spiders are rotatable concentric with, but independently of the shaft. The spiders have three arms, and corresponding arms on all three are in vertical alinement; the middle spider 10 having its arms made in two parts secured by slots and bolts, so as to be radially adjustable. At the end of each spider arm is a bearing. A short upright tubular spindle 13 is journaled in each of the bearings of the lower spider 9. A pinion 14 meshing with the spur gear 5 is loose on the spindle, but it can be clutched thereto by suitable means, such for instance as a pin 15 on the spindle engaging a notch 16 in the pinion when the latter is slid up along the spindle. The pinion rests on collar 17 secured to the spindle, but it may be lifted by two hooks 18 engaging its under face and pivoted to a hand lever 19 fulcrumed at 20 on the arm of the spider.

In the support 3 below the pinion at the sealing-in station of the machine, and in line with the tubular spindle, is a vertical sliding tube 21 having at its upper end a loose rotatable collar 22 carrying a rubber gasket 23 which makes an air-tight joint with the lower end of the spindle when said tube is slid upward by a lever 24 fulcrumed to the support 3. The lower end of said pipe communicates with a supply of compressed air.

The upper end of the spindle 13 has two opposite arms 25 forming a yoke to support a carrier or clamp for the outer blank $x$. The clamp is annular, of a shape to fit the blank, and is concentric with the axis of the spindle, one half 26 being stationary and the other half 27 being hinged to 26 at one end and provided at the other end with a catch 28 to hold it closed. Upon releasing the catch, the half 27 can be thrown open as shown in dotted lines in Fig. 3. Each half has two upright guide rods 29, preferably faced with leather or the like to afford a soft holder for the blank $x$. The clamps and rods are preferably made of aluminum for the sake of lightness. The lower end of the blank rests upon an annular rubber cushion 30 at the top of the spindle 13, concentric with the passage through said spindle, which registers with a small hole in the center of the rounded end of the blank.

A tube 31 is mounted in the bearing at the end of each arm of the middle spider 10. On one side of said tube is a rack 32 with which engages a cog wheel 33 on an arbor rotatable by hand wheel 34; by means of which the tube can be run up and down in its bearing. A slender shaft 35 extends through the tube, being journaled therein but incapable of movement lengthwise thereof. The shaft extends up through a bearing 36 in the arm of the upper spider 11 and is splined in a pinion 37 resting on said bearing and meshing with the upper spur gear 6, being held in place by a guard 38 engaging its upper face. Pinion 37 is of the same size as pinion 14. At the lower end of the shaft is a rounded pad 39 to bear against the bottom of the inner blank y. An expanding holder for the inner blank y is secured to the lower end of the shaft; such holder being preferably a set of bars 40 parallel with the inner surface of the blank and mounted on links 41 pivoted to said bars and to a sleeve 42 secured to the shaft, so that said bars will have a parallel ruler action. The bars can be spread or contracted by a sleeve 43 slidable on the shaft and connected to said bars by links 44. The sleeve is moved lengthwise on the shaft, preferably by a lever 45 engaging a groove in a collar 46 at the upper end of said sleeve and fulcrumed on a hanger 47 supported by the tube 31, being preferably hinged to a lug on a collar 48 secured to said tube. The sleeve 43 has a protecting jacket 49 of asbestos. From the collar 48 two guide rods 50 run down parallel with the sleeve 43, and on said rods slides an annular former 51 concentric with the sleeve and having in its under side a semicircular groove which shapes the upper end of the glass jar when pressed down upon the softened united edges of the two blanks. The former has a handle 52 and can be retained in its uppermost position until wanted, by a hook 53 pivoted to the collar 48 and engaging with said handle.

Surrounding the lower spider 9 is a circular rim 54 in which are three sockets 55 spaced angularly apart to correspond with the arms of the spiders; that is to say, preferably at 120 degrees. A stop is arranged to engage with said sockets to hold the spiders stationary while the blanks are being loaded, operated upon or unloaded. The stop is preferably a plunger 56 mounted in a standard 57 on the support 3 and reciprocating in a line radial to the shaft 1. A lever 58 engages with the plunger, and can be actuated either by foot or hand to withdraw the plunger; a spring 59 urging the plunger against the rim and into the socket therein.

A brake 60, supported on the plunger, is urged constantly against the rim 54 by a spring 61, to prevent too violent movements thereof and lessen the shock when the plunger shoots into a socket and stops the revolution of the spiders.

One stopping point of the carriers is the unloading or loading station, where the sealed jars are taken out and the fresh blanks put in. At the next stopping point, a Bunsen burner 62 is arranged, which softens the edges of the blanks as they rotate in front of it. At the third station are the sealing burners, of which six are shown in the drawings. They are short upright Bunsen burners 63 having their tips bent radially inward toward the axis of the blanks. They are mounted on the halves of a hollow ring 64, said halves being hinged on a standard 65 so that they can be swung apart in a horizontal plane to admit the blanks, and can then be closed around them. The standard can be raised and lowered, preferably by a rack 66 and a pinion operated by the hand wheel 67. Each half of the ring is connected by a flexible tube 68 with a gas main.

The operation is as follows: An attendant sits at station one and by means of the hand wheel 34 runs up the tube 31 and the shaft 35 with its expanding holder. By lifting the handle 45, the holder is collapsed to let an inner blank y slip up over it and be held by the spreading of the bars 40 when the handle 45 is dropped. The front half 27 of the clamp is then opened, and an outer blank x placed in position, making a tight joint with the gasket 30 and with the hole in its end registering with the tubular spindle. The front of the clamp is then shut and fastens itself by the spring catch 28. The hand wheel 34 is then turned to feed the inner blank down into the outer one until they are in proper relative position, with the bottom of the inner blank as far from the bottom of the outer one as the space between the vertical walls of said blanks; that is the two blanks are concentric. The lever 19 is then thrown up to engage the notch 16 in the pinion 14 with the pin 15 on the spindle, whereupon the constantly rotating pinion will begin to rotate the clamp and the outer blank. The inner blank begins to rotate as soon as it is engaged by its holder, and this assists in the rapid centering of the blanks. Both blanks are now rotating in the same direction and at the same speed. The detent plunger 56 is now withdrawing and the friction of the gears and pinions causes the spiders to turn a third of a revolution, bringing the blanks opposite the Bunsen burner 62, whose flame is adjusted to soften their edges. During this movement, the brake 60 bears against the rim 54 to prevent too violent action, and When the blanks arrive at the second station the plunger 56 snaps into a socket 55 and arrests the spiders and blanks. The attendant now loads the second clamp and holder, and again the spiders make a third of a revolution. This brings the second set of blanks opposite the Bunsen burner 62, while the first set is stopped in front of the standard 65 at the sealing-in station. Another attendant at this station shuts the burner ring around the blanks, and regulates the fires so as to quickly bring the edges of the blanks up to a welding heat. The asbestos jacket 49 protects the sleeve 43 from the flames. The former 51 is slid down upon the plastic edges to press them together. The operator then lifts the pipe 21 and presses the gasket 23 tightly against the end of the rotating spindle, the collar 22 rotating with it. Air under pressure is then admitted through the pipe 21 and the tubular spindle 13 into the space between the blanks to force their softened edges into the groove in the former and give them the proper shape. Meanwhile a third set of blanks is loaded into the third carrier. Upon tripping the detent, the spiders continue their revolution, bringing the finished blanks to the first attendant, who removes them and reloads the carrier.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A machine for sealing together concentric glass blanks, which comprises a central shaft, upper and lower spur gears secured thereto, a sleeve on said shaft, spiders carried by said sleeve, spindles rotatable in the lower spider, clamps for the outer blanks mounted on spindles, holders for the inner blanks carried by an upper spider, and pinions meshing with said gears for rotating said spindles and holders at the same speed, means for stopping and starting the spindles at will, and means for raising and lowering the holders for the inner blanks.

2. A machine for sealing together concentric glass blanks, comprising a central shaft, upper and lower spur gears thereon, a sleeve rotatable on said shaft, spiders on said sleeve, spindles rotatably mounted in the lower spider, pinions on said spindles meshing with the lower gear, means for connecting and disconnecting said pinions and spindles, clamps for the outer blanks mounted on the spindles, upright shafts carried by an upper spider, holders for the inner blanks mounted on said shafts, pinions splined on said shafts and meshing with the upper gear, and means for raising and lowering said shafts and holders and an annular elastic cushion at the bottom of the clamp concentric with the bore of the tubular spindle.

3. In a machine for sealing together concentric glass blanks, an upright shaft, a spur gear thereon, a spider rotatable on said shaft, a tubular spindle journaled in said spider, a pinion on said spindle, means for engaging and disengaging it from the spindle, and a clamp mounted on said spindle and having one half hinged to the other half.

4. In a machine for sealing together concentric glass blanks, an upright shaft, a spur gear thereon, a spider rotatable on said shaft, a tubular spindle journaled in said spider, a pinion on said spindle meshing with said gear, a clamp mounted on the upper end of said spindle, a pipe in line with said spindle, a stationary support for said pipe, means for sliding said pipe lengthwise in said support, and a loose rotatable collar on the end of said pipe to make a tight joint with the lower end of said spindle for conducting fluid pressure into a vessel held in said clamp and having an aperture registering with said tubular spindle.

5. In a machine for sealing together concentric glass blanks, a central shaft, a spur gear thereon, a spider rotatable on said shaft, a tube vertically movable in said spider, a shaft rotatable in said tube and geared to said spur gear, an expanding holder on said shaft for the inner blank, a sleeve movable lengthwise of said shaft and operatively connected to said holder for expanding and contracting the same, a lever fulcrumed on said tube and engaging said sleeve, a jacket of refractory material on said sleeve, and burners encircling the upper ends of the assembled blanks.

6. In a machine for sealing together concentric glass blanks, a central shaft, a spur gear thereon, a spider rotatable on said shaft, a tube vertically movable in said spider, means for raising and lowering said tube, a shaft rotatable in said tube and movable lengthwise therein and geared to said spur gear, an expanding holder on said shaft for the inner blank consisting of parallel bars, links connecting said bars to said shaft, a sleeve surrounding said shaft and movable lengthwise thereof, a lever fulcrumed on said tube and engaging said sleeve, and links between said sleeve and said bars.

7. In a machine for sealing together concentric glass blanks, a central shaft, a spur gear thereon, a spider rotatable on said shaft, a tube vertically movable in said spider, means for raising and lowering said tube, a shaft rotatable in said tube and movable lengthwise therein, and geared to said spur gear, an expanding holder on said shaft for the inner blank, means for operating said holder, guide rods parallel with the shaft, an annular former sliding on said rods, and means for retaining said former in its raised position when not in use.

In testimony whereof I affix my signature in presence of two witnesses.

FREDERICK W. BARTLETT.

Witnesses:
JOSEPH N. TUTTLE,
WILLIAM H. BLACK.